United States Patent [19]
Shi et al.

[11] Patent Number: 5,747,183
[45] Date of Patent: May 5, 1998

[54] ORGANIC ELECTROLUMINESCENT LIGHT EMITTING MATERIAL AND DEVICE USING SAME

[75] Inventors: Song Shi, Phoenix; Franky So, Tempe, both of Ariz.; H. C. Lee, Calabasas, Calif.

[73] Assignee: Motorola, Inc., Schaumburg, Ill.

[21] Appl. No.: 743,257

[22] Filed: Nov. 4, 1996

[51] Int. Cl.⁶ ........................................ B32B 9/00
[52] U.S. Cl. .................. 428/690; 428/691; 313/503; 313/504; 313/505; 313/506
[58] Field of Search .................... 428/690, 691; 313/503, 504, 505, 506

[56] References Cited

U.S. PATENT DOCUMENTS

| | | | |
|---|---|---|---|
| 4,539,507 | 9/1985 | VanSlyke et al. | 313/504 |
| 4,800,136 | 1/1989 | Arakawa et al. | 428/691 |
| 5,126,214 | 6/1992 | Tokailin et al. | 428/690 |
| 5,256,945 | 10/1993 | Imai et al. | 313/504 |
| 5,443,921 | 8/1995 | Hosokawa et al. | 428/690 |
| 5,518,824 | 5/1996 | Funhoff et al. | 428/690 |

*Primary Examiner*—Melvyn I. Marquis
*Attorney, Agent, or Firm*—Eugene A. Parsons

[57] ABSTRACT

An organic electroluminescent display device (10) includes first and second electrode assemblies fabricated on a transparent substrates (12). Disposed between the electrode assemblies are one or more layers of organic electroluminescent light emitting materials (20). The organic electroluminescent light emitting material is preferably characterized by an emitted light having a wavelength of between 4000 Å and 6000 Å. This light emitting material may be comprised of a mixture of a first host emitting material and a second host emitting material, and may further include a dopant so as to improve the emission efficiency of the light emitting material as well as to adjust the emission characteristic to a desired specification.

25 Claims, 1 Drawing Sheet

ORGANIC ELECTROLUMINESCENT LIGHT EMITTING MATERIAL AND DEVICE USING SAME

TECHNICAL FIELD

This invention relates in general to flat panel information display devices, and in particular to light emitting organic electroluminescent information display devices.

BACKGROUND OF THE INVENTION

Until fairly recently, the preferred, indeed the only means by which to display information in the electronic medium was to use a video monitor comprising a cathode ray tube ("CRT"). CRT technology has been well known for over 50 years, and has gained widespread commercial acceptance in applications ranging from desktop computer modules to home televisions and industrial applications. CRTs are essentially large vacuum tubes having one substantially planar surface upon which information is displayed. Coated on the inside of the CRT planar surface is a layer of phosphors which respond by emitting light when struck by electrons emitted from the electron gun of the CRT. The electron gun is disposed in an elongated portion which extends away from the inside of the CRT display surface.

While CRTs are widely used in numerous applications, there are several inherent limitations to the application of CRT technology. For example, CRTs are relatively large and consume a great deal of energy. Moreover, as they are fabricated of glass, the larger the display surface, the heavier the CRT. Given the need for the electron gun to be spacedly disposed from the phosphors surface of the display surface, CRTs have a substantial depth dimension. Accordingly, CRTs have little use in small and portable applications, such as handheld televisions, laptop computers, and other portable electronic applications which require the use of displays.

To answer the needs of the marketplace for smaller, lighter, more portable display devices, manufacturers have created numerous types of flat panel display devices. Examples of flat panel display devices include active matrix liquid crystal displays (AMLCDs), plasma displays, and electroluminescent displays. Each of these types of displays has use for a particular market application, though each is accompanied by various limitations which make them less than ideal for certain applications. Principal limitations inherent in devices such as AMLCDs relate to the fact that they are fabricated predominantly of inorganic semiconductor materials by semiconductor fabrication processes. These materials and processes are extremely expensive, and due to the complexity of the manufacturing process, cannot be reliably manufactured in high yields. Accordingly, the costs of these devices are very high with no promise of immediate cost reduction.

One preferred type of device which is currently receiving substantial research effort is the organic electroluminescent device. Organic electroluminescent displays (OEDs) are generally composed of three layers of organic molecules sandwiched between transparent, conductive and/or metallic conductive electrodes. The three layers include an electron transporting layer, an emissive layer, and a hole transporting layer. Charge carriers specifically, electrons and holes, are generated in the electron and hole transporting region. Electrons are negatively charged atomic particles and holes are the positively charged counterparts. The charge carriers are injected into the emissive layer, where they combine, emitting light. OEDs are attractive owing to their thin profile, lightweight, and low driving voltage, i.e., less than about 20 volts.

OEDs have a potential application to full color flat emissive displays.

Several schemes to achieve full color display have been disclosed. For example, in U.S. Pat. No. 5,015,999, there is disclosed a color display with an OED device which emits radiation in the ultraviolet portion of the electromagnetic spectrum. This ultraviolet radiation is then passed through a filter which fluoresces blue light in response to the ultraviolet light generated by the OED. However, an OED that reliably emits ultraviolet light has yet to be invented. Similarly, U.S. Pat. No. 5,126,214 discloses a device in which an OED emits light in the blue portion of the electromagnetic spectrum, as does the material described in U.S. Pat. No. 5,294,870. However, in both cases, the device is limited by the fact that blue emitting electroluminescent displays described therein have a limited thermal stability window and poor efficiency.

A new scheme that can produce a full color display is disclosed in commonly assigned copending U.S. patent application Ser. No. 08/706,873 filed Sep. 3, 1996 in the names of Shi, et al. the disclosure of which is incorporated herein by reference. That disclosure uses a blue-green emitting OED in combination with blue and green absorption filters, and red fluorescent color medium to achieve a full color display. That device thus requires an OED device that can reliably and inexpensively produce light in the blue-green range of the spectrum.

Accordingly, there exists a need for a reliable blue-green OED for providing full color information display thereon. The device should make use of a stable organic electroluminescent display element properly modified to provide light in the blue-green portion of the electromagnetic spectrum.

Moreover, the OED should be relatively inexpensive to manufacture and easily adaptable to a host of different display applications.

DETAILED DESCRIPTION OF THE PREFERRED EMBODIMENT

Figure 1:
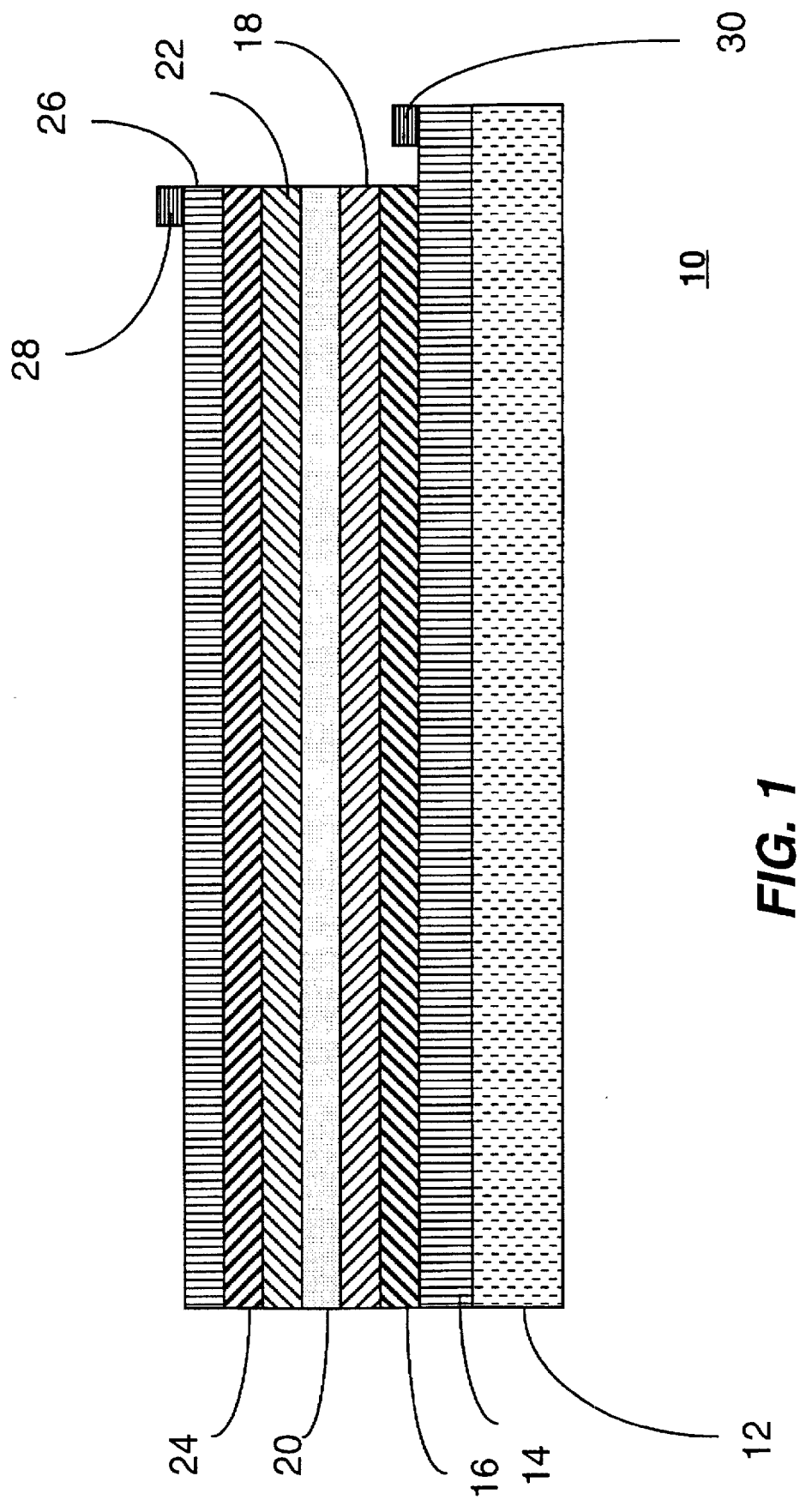
FIG. 1 is a cross-sectional side view of an organic electroluminescent display device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an organic electroluminescent device as is well known in the art. The device 10 contains, as a rule, one or more layers of organic charge transport materials. The device 10 is fabricated upon a first substrate 12 which is transparent and may be fabricated of any of a number of known materials employed in the art. For example, the substrate 12 may be fabricated of a glass, such as a Corning 7059 glass, transparent plastic substrates made of polyolefins, polyethersulfones, and polyarylates. In one preferred embodiment, the substrate 12 is fabricated of glass of quality good for flat panel display applications.

Deposited atop substrate 12 is a first electrode 14, which is electrically conductive and optically transparent or semi-transparent. Several materials may be advantageously employed as the first electrode for an OED device. Examples of materials include conductive metal oxides such as indium oxide, indium-tin oxide (ITO), zinc oxide, zinc-tin oxide, conductive transparent polymers such as polyaniline, and combinations thereof. Alternatively, the electrode 14 may be fabricated of a semi-transparent metal, examples of which include a thin layer (<500 Å) of gold, copper, silver, and combinations thereof. In one preferred embodiment, the electrode 14 is fabricated of ITO or zinc oxide.

Thereafter, a first layer of an organic material 16 is deposited atop the first electrode 14. The first layer 16 is an organic material adapted to accept holes from the first electrode 14, the holes being for subsequent combination with electrons in the emitter layer described herein below. The layer 16 is known as the hole injecting layer and also acts as a buffer layer to match the thermal and mechanical properties of the first electrode and the subsequent layers of organic materials. The hole injecting layer is preferably comprised of a porphyrinic compound of the type disclosed by, for example, Adler in U.S. Pat. No. 3,935,031 or Tang in U.S. Pat. No. 4,356,429. Examples of the preferred compounds include copper phthalocyanine, or zinc phthalocyanine, to name a few.

Thereafter deposited atop the hole injecting layer 16 is a hole transporting layer 18. The purpose of the hole transporting layer is to facilitate the transport of holes from the hole injecting layer 16 to the emitter layer 20 where they are combined with the electrons to create photons for the emission of light. The hole transporting layer 18 may be fabricated from a material such as that described in commonly assigned copending U.S. patent application Ser. No. 08/706,898 filed Sep. 3, 1996 in the names of Shi, et al, the disclosure of which is incorporated herein by reference.

Thereafter deposited atop the hole transporting layer 18 is a layer of emitter material. The emitter layer 20 is typically comprised of a host emitting matrix and a guest emitter. The host emitting matrix is fabricated of an organic material adapted to accommodate both holes and electrons and then transfer the excited state energies to the guest emitter, wherein the holes and electrons combine and emit a photon of light causing a visible change in the appearance of the OED device to a viewer thereof. The light emitting layer is fabricated of a light emitting material which will be described in greater detail hereinbelow.

Thereafter deposited atop the emitter layer 20 is an electron transporting layer 22 fabricated of a material such as that disclosed in U.S. Pat. No. 4,769,292 and U.S. Pat. No. 5,529,853. Alternatively, and in a preferred embodiment, the material may be that disclosed in the aforementioned commonly assigned, co-pending U.S. patent application Ser. No. 08/304,451 filed Sep. 12, 1994. The electron transporting layer, like the hole transporting layer 18, is adapted to gather charge carriers, in this case electrons, generated in an electron injecting layer for transport to the emitter layer where they are combined with holes as described hereinabove. In this regard, materials appropriate for the electron transporting layer include tris(8-hydroxylquinolinolate) aluminum, bis(10-hydroxy-benzo(h)quinolinate) beryllium, bis(2-(2-hydroxy-phenyl)-benzothiazolate) zinc, bis(2-(2-hydroxy-phenyl)-benzothiazolate) zinc, and combinations thereof.

Thereafter deposited atop the electron transporting layer is an electron injecting layer 24. The electron injecting layer 24 like the hole injecting layer 14 is adapted to accept charge carriers, in this case electrons. In general, the electron injection layer 24 may be omitted without significant compromise of the device performance.

Deposited atop the electron injecting layer is a second electrode 26 which is typically formed of a metal of work function of less than about 4 electron volts (eV) and at least one other protective metal of higher work function. The preferred low work function metal is selected from a group of lithium, magnesium, calcium, strontium, and combinations thereof, while the preferred high work function metal is selected from a group of aluminum, indium, copper, gold, silver, combinations thereof.

Alternatively, the second electrode is formed of an alloy of a lower work function metal and a high work function metal by co-evaporation. The content of the low work function metal in the second electrode can vary from 0.1% to 50%, but is preferably below 20%.

In operation, holes inject from the first electrode (also called anode) and electrons inject from the second electrode (also called cathode) into the organic layers disposed between the electrically conductive electrodes 14 and 26, when an electrical current is applied between the anode and cathode. An electrical current may be applied by connecting the electrodes to electrical current generation means (not shown) at electrical contacts 28 and 30 on electrodes 26 and 14 respectively. Electrical contacts may be fabricated of any type of electrically conductive material which is mechanically compatible with the electrode materials.

This invention is specifically directed to organic electroluminescent light emitting materials used to fabricate layer 20 having emission peaks with a wavelength of between 4000 and 6000 Å and preferably between 4400 and 5500 Å. It can thus be appreciated that the material is adapted to emit light in the blue and green region of the electromagnetic spectrum.

The light emitting material preferably comprises a mixture of a first host emitting material adapted to emit light having a wavelength of between 4000 Å and 5000 Å, and a second host emitting material adapted to emit light having a wavelength of between 5000 Å and 6000 Å. The ratio of the first host emitting material to the second host emitting material may be such that the first host emitting material comprises between 0.1 and 99.9 percent of the total light emitting material. In one preferred embodiment, the first host emitting material, preferably comprises between 25 and 75 percent of the light emitting material. It is to be understood that the relative percentages of both of the first and second host emitting materials depends upon the precise color of light which is desired to be emitted by the light emitting material. Accordingly, if the blue/green light is desired to be more in the blue region of the electromagnetic spectrum, a greater percentage of the first host emitting material will be used. Conversely, if the desired light is to be more in the green portion of the electromagnetic spectrum, then a greater portion of the second hosting emitting material will be used.

The light emitting material may further be doped with one or more dopants in the nature of guest fluorescent dyes. The dopants may be present in concentrations ranging from 0.1 to 10 mole percent. The purpose of the dopant is to improve the emission efficiency of the light emitting material, and to adjust the emission characteristics to a desired specification. The dopant is preferably a guest florescent dye with emission wavelength of between 4000 to 6000 Å, preferably between 4500 to 5500 Å, which is in the blue to green range of visible light. The dopant may be selected from the group of materials consisting of perylene, coumarin 6 (3-(2- benzothiazolyl)-7-(diethylamino)coumarin), coumarin 153 (2,3,6,7-tetrahydro-9-(trifluoromethyl-1H,5H, 11H-[1]benzopyrano[6,7,8-ij] quinolizin-11-one), 1,4-bis(2,2-di-p-tolylvinyl) benzene, tetraphenylbutadiene, pentaphenylcyclopentadiene, bis(5-tert-butyl-2-benzoxazolyl thiophene, quinacridone, methylquinacridone, coronene, pentacene and combinations thereof.

As noted above, the light emitting material is a combination or mixture of the first and second host emitting materials. The first host emitting material is selected from the group of materials characterized by the formula (R—Q)2-Al—O—L, wherein Q is a substituted 8-quinolinolate lignin, R is an 8-quinolinolate ring substituent, O—L is a phenolate lignin where L in particular is a hydrocarbon of from 6 to 24 carbons comprising a phenyl moiety, and Al is aluminum. Accordingly, preferred materials conforming to this formula include bis(2-methyl-8-quinolinolato) phenolato aluminum, bis-2-methyl-8-quinolinolato)-2-cresolato aluminum, and combinations thereof. The first host emitting material may also be selected from the group of other materials including bis(2-(2-hydroxylphenyl)-benzoxazolate) zinc, bis(2-(2-hydroxylphenyl)-benzoxazolate) magnesium, and combinations thereof.

The second host emitting material may be selected from the group of metal chelated oxinoid materials disclosed in U.S. Pat. No. 4,769,292 and U.S. Pat. No. 5,529,853. In a preferred embodiment of the second host emitting material is selected from the group of material consisting of tris(8-hydroxylquinolinolate) aluminum, bis(10-hydroxylbenzo(h)quinolinate) beryllium, bis(2-(2-hydroxyphenyl)-benzothiazolate) zinc, and combinations thereof.

The instant OED device is preferred to emit light with two emission maxima, one of which is in the blue range with a peak wavelength between 4000 and 5000 Å, another of which is in the green range with a peak wavelength between 5000 and 6000 Å. Both the emission maxima and the luminous ratio of the amount of blue to green light can be adjusted by varying the ratio of the first host emitting material to the second host emitting material as well as the percentage of fluorescent dye dopants as described above. The ideal emission will have a first maximum at around 4500 to 4600 Å for the blue peak and a second maximum at around 5200 to 5400 Å for the green peak with blue to green luminous ratio around 1:7.

While the preferred embodiments of the invention have been illustrated and described, it will be clear that the invention is not so limited.

Numerous modifications, changes, variations, substitutions and equivalents will occur to those skilled in the art without departing from the spirit and scope of the present invention as defined by the appended claims.

What is claimed is:

1. An organic electroluminescent light emitting material characterized by an emitted light having a wavelength of between 4000 Å and 6000 Å, said light emitting material comprising a mixture of a first host emitting material adapted to emit light having a wavelength of between 4000 Å and 5000 Å, and a second host emitting material adapted to emit light having a wavelength of between 5000 and 6000 Å.

2. An organic electroluminescent light emitting material as in claim 1, wherein the first host emitting material comprises between 0.1 and 99% of said light emitting material.

3. An organic electroluminescent light emitting material as in claim 1, wherein the first host emitting material comprises between 25 and 75% of said light emitting material.

4. An organic electroluminescent light emitting material as in claim 1, further including at least one dopant material.

5. An organic electroluminescent light emitting material as in claim 4, wherein said dopant is a fluorescent dye dopant material having an emission wavelength of between 4000 to 6000 Å.

6. An organic electroluminescent light emitting material as in claim 5, wherein said fluorescent dye dopant is present in said light emitting material in a concentration of between 0.1 and 10 mole percent.

7. An organic electroluminescent light emitting material as in claim 4, wherein said dopant is selected from the group of materials consisting of perylene, coumarin 6 (3-(2-benzothiazolyl)-7-(diethylamino)coumarin), coumarin 153 (2,3,6,7-tetrahydro-9-(trifluoromethyl-1H,5H,11H-[1]benzopyrano[6,7,8-ij]quinolizin-11-one), 1,4-bis(2,2-di-p-tolylvinyl)benzene, tetraphenylbutadiene, pentaphenylcyclopentadiene, bis(5-tert-butyl-2-benzoxazolyl thiophene, quinacridone, methylquinacridone, coronene, pentacene, and combinations thereof.

8. An organic electroluminescent light emitting material as in claim 1, wherein said first host emitting material is selected from the group of materials characterized by the formula (R—Q)2-Al—O—L wherein Q is a substituted 8-quinolinolate ligand, R is an 8-quinolinolate ring substituent, O—L is a plenolato ligand, wherein L is a hydrocarbon of from 6 to 24 carbons comprised of a phenyl moiety and Al is aluminum.

9. An organic electroluminescent light emitting material as in claim 1, wherein said first host emitting material is selected from the group of materials consisting of bis(2-methyl-8-quinolinolato phenolato)aluminum, bis(2-methyl-80-quinolinolato-2-cresolato)aluminum, bis(2-(2-hydroxylphenyl)benzoxazolate) zinc, bis(2-(2-hydroxylphenyl)-benzoxazolate) magnesium, and combinations thereof.

10. An organic electroluminescent light emitting material as in claim 1, wherein said second host emitting material is selected from the group consisting of tris(8-hydroxyl quinolinolate) aluminum, bis(10-hydroxybenzo(h)quinolinate)beryllium, bis(2-(2-hydroxyphenyl)benzothiazolate) zinc, and combinations thereof.

11. An organic electroluminescent display device having an anode, a cathode, and a light emitting material disposed there between, said light emitting material having a wavelength of between 4000 Å and 6000 Å, said light emitting material comprising a mixture of a first host emitting material adapted to emit light having a wavelength of between 4000 Å and 5000 Å, and a second host emitting material adapted to emit light having a wavelength of between 5000 and 6000 Å.

12. An organic electroluminescent display device as in claim 11, wherein the first host emitting material comprises between 0.1 and 99% of said light emitting material.

13. An organic electroluminescent display device as in claim 11, wherein the first host emitting material comprises between 25 and 75% of said light emitting material.

14. An organic electroluminescent display device as in claim 11, further including at least one dopant material.

15. An organic electroluminescent display device as in claim 14, wherein said dopant is a fluorescent dye dopant material having an emission wavelength of between 4000 to 6000 Å.

16. An organic electroluminescent display device as in claim 15, wherein said fluorescent dye dopant is present in said light emitting material in a concentration of between 0.1 and 10 mole percent.

17. An organic electroluminescent light emitting material as in claim 14, wherein said dopant is selected from the group of materials consisting of perylene, coumarin 6 (3-(2-benzothiazolyl)-7-(diethylamino)coumarin), coumarin 153 (2,3,6,7-tetrahydro-9-(trifluoromethyl-1H,5H,11H-[1] benzopyrano[6,7,8-ij]quinolizin-11-one), 1,4-bis(2,2-di-p-tolylvinyl)benzene, tetraphenylbutadiene, pentaphenylcyclopentadiene, bis(5-tert-butyl-2-benzoxazolyl thiophene, quinacridone, methylquinacridone, coronene, pentacene, and combinations thereof.

18. An organic electroluminescent display device as in claim 11, wherein said first host emitting material is selected from the group of materials characterized by the formula (R—Q)2-Al—O—L wherein Q is a substituted 8-quinolinolate ligand, R is an 8-quinolinolate ring substituent, O—L is a plenolato ligand, wherein L is a hydrocarbon of from 6 to 24 carbons comprised of a phenyl moiety and Al is aluminum.

19. An organic electroluminescent display device as in claim 11, wherein said first host emitting material is selected from the group of materials consisting of bis(2-methyl-8-quinolinolato phenolato)aluminum, bis(2-methyl-80-quinolinolato-2-cresolato)aluminum, bis(2-(2-hydroxylphenyl)benzoxazolate) zinc, bis(2-(2-hydroxylphenyl)benzoxazolate) magnesium, and combinations thereof.

20. An organic electroluminescent display device as in claim 11, wherein said second host emitting material is selected from the group consisting of tris(8-hydroxyl quinolinolate) aluminum, bis(10-hydroxybenzo(h) quinolinate)beryllium, bis(2-(2-hydroxyphenyl) benzothiazolate) zinc, and combinations thereof.

21. An organic electroluminescent light emitting device having an anode, a cathode, and a light emitting material disposed therebetween, said light emitting material being characterized by having two light emission maxima, a first maxima having a peak wavelength between 4000 and 5000 Å, and a second maxima having a peak wavelength of between 5000 and 6000 Å.

22. An organic electroluminescent light emitting device as in claim 21, wherein said light emitting material comprising a mixture of a first and second host emitting material.

23. An organic electroluminescent light emitting device as in claim 22, wherein the first host emitting material comprises between 0.1 and 99% of said light emitting material.

24. An organic electroluminescent light emitting device as in claim 22, wherein said first host emitting material is selected from the group of materials consisting of bis(2-methyl-8-quinolinolato phenolato)aluminum, bis(2-methyl-80-quinolinolato-2-cresolato)aluminum, bis(2-(2-hydroxylphenyl)benzoxazolate) zinc, bis(2-(2-hydroxylphenyl)benzoxazolate) magnesium, and combinations thereof.

25. An organic electroluminescent light emitting device as in claim 22, wherein said second host emitting material is selected from the group consisting of tris(8-hydroxyl quinolinolate) aluminum, bis(10-hydroxybenzo(h) quinolinate)beryllium, bis(2-(2-hydroxyphenyl) benzothiazolate) zinc, and combinations thereof.

* * * * *